United States Patent [19]
Hinderks

[11] 3,922,014
[45] Nov. 25, 1975

[54] BUMPER MOUNTING

[76] Inventor: Mitja Victor Hinderks, 15 A Adamson Road, London N.W. 3, England

[22] Filed: Apr. 9, 1973

[21] Appl. No.: 349,178

[30] Foreign Application Priority Data
Apr. 7, 1972 United Kingdom............... 16079/72

[52] U.S. Cl..................... 293/88; 267/140; 188/1 C
[51] Int. Cl.²......................................... B60R 19/02
[58] Field of Search.............. 293/1, 71 R, 71 P, 85, 293/86, 88, 89; 267/140, 141; 114/219; 188/1 C

[56] References Cited
UNITED STATES PATENTS

| | | | |
|---|---|---|---|
| 1,439,209 | 12/1922 | Watson................................. | 293/88 |
| 3,006,484 | 10/1961 | Pringiers............................. | 188/1 C |
| 3,363,475 | 1/1968 | Foster et al......................... | 267/141 |

*Primary Examiner*—Evon C. Blunk
*Assistant Examiner*—Robert Saifer
*Attorney, Agent, or Firm*—Wigman & Cohen

[57] ABSTRACT

A protective bumper for a vehicle which may be shaped in the form of an airfoil so that air passing over the bumper produces an aerodynamic reaction normal to its direction of movement which causes a downwardly directed thrust to be transmitted to the vehicle. The bumper may comprise at least one main body portion and at least one secondary portion, the latter being movable relatively to the main body portion upon being subjected to an impact loading and returning to the original position upon removal of the loading. The bumper may be mounted on a vehicle by means of mountings provided with flange means imbedded in a compressible material contained in a housing having internal flange means of helical configuration. Further disclosed is a bumper formed of bent timber and a method of forming such bumper by heating and moistening the timber, bending the timber to the required shape and then drying.

5 Claims, 17 Drawing Figures

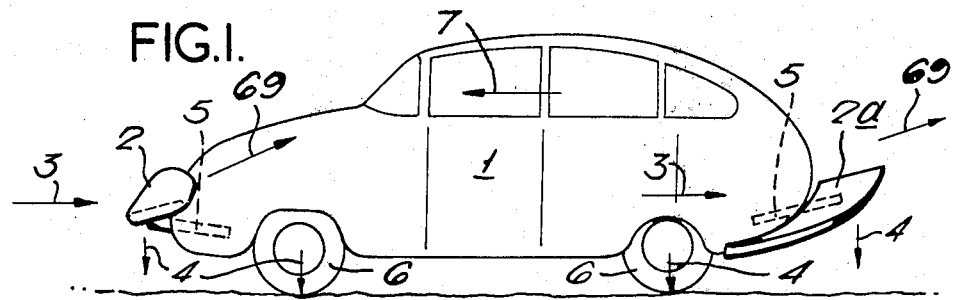
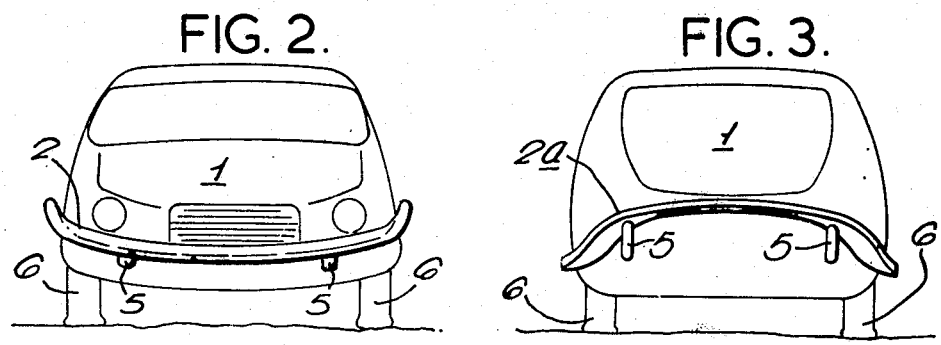
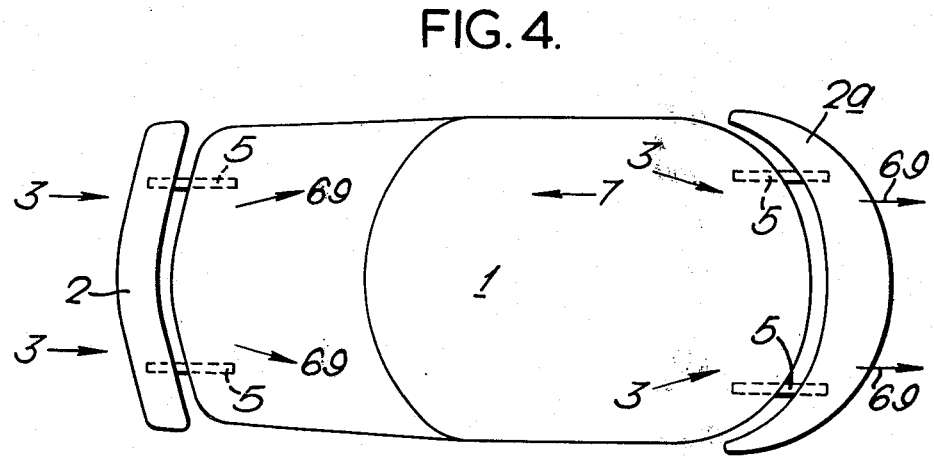
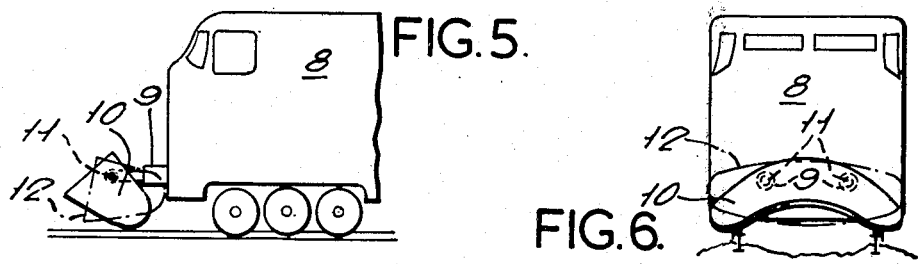

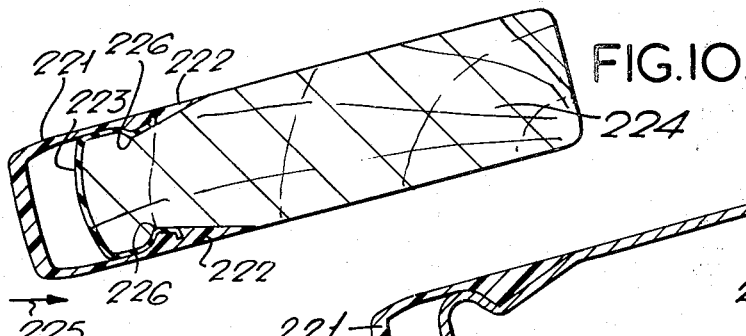
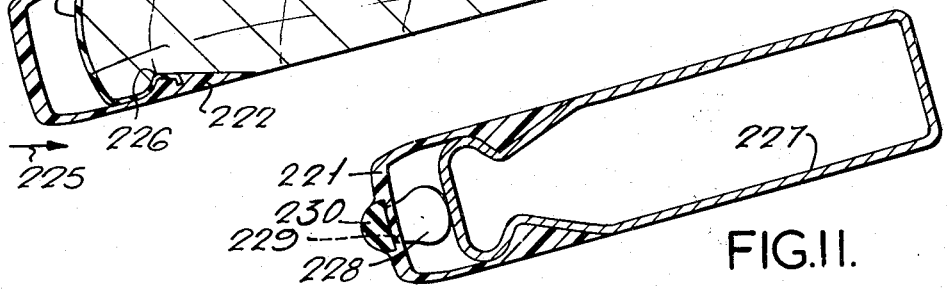
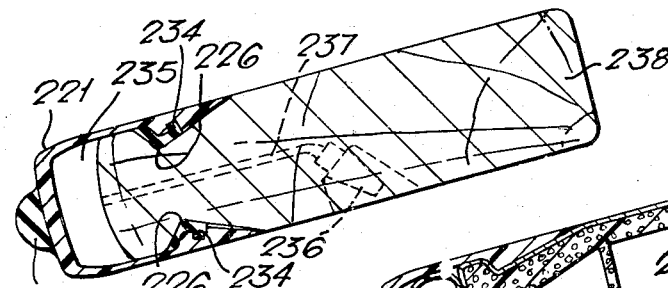
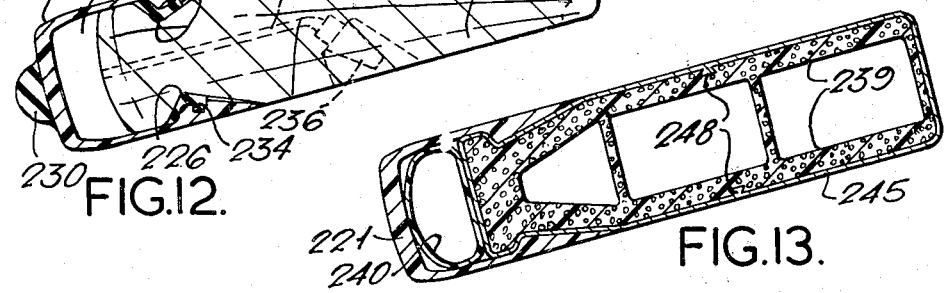
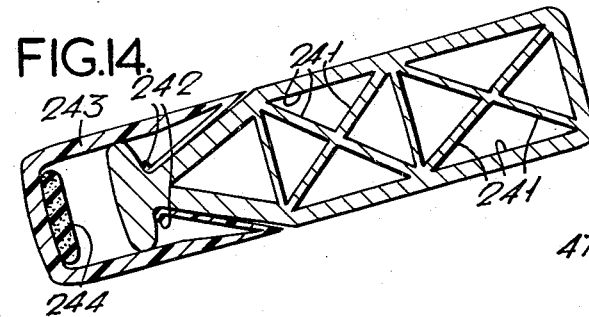
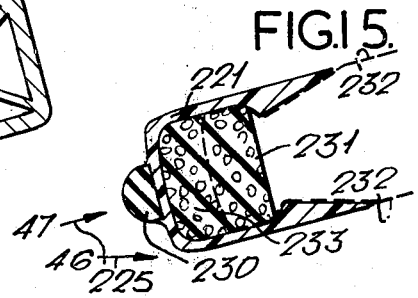
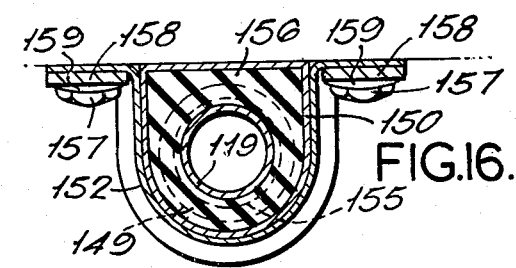
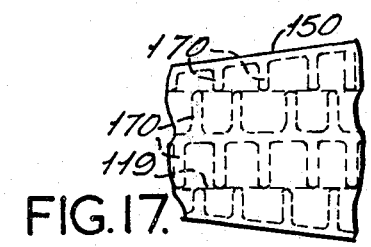

BUMPER MOUNTING

The present invention relates to protective bumpers for motor vehicles, including tracked vehicles.

The object of the invention is to provide bumpers which improve pedestrian and/or passenger and vehicle safety by (a) being arranged to cause the vehicle on which they are mounted to have a better co-efficient of adhesion with the road (b) causing the bumper to itself deform and return undamaged to its original shape on moderate impact (a) mounting the bumper in such a manner that on being subjected to a high impact force from any direction it will move from and to its original position substantially undamaged, (d) further mounting the bumper in such a way that on serious impact the mountings absorb a large proportion of the impact load that would otherwise be transferred to vehicle, (e) mounting the bumper in such a manner that on impact it alters its alignment to one in which it is best able to protect the vehicle, (f) making the bumper of a material which is better able to absorb load deflection, etc., in relationg to its weight than other currently used materials.

In the case of tracked vehicles a further object is, in addition to any or all of the above objects, to arrange the bumper in such a manner so that it assists in throwing objects or persons clear of the tracks, either into a central well between the tracks or clear of the path of the vehicle.

The present invention consists in a vehicle having a protective bumper so shaped and positioned that, in use, air passing over the bumper produces an aerodynamic reaction normal to its direction of movement which causes a downwardly directed thrust to be transmitted to the vehicle.

Such a bumper may also be automatically tilted, on serious impact, from an angle determined by its aerofoil function to one where it will best transfer or absorb loads.

The invention further consists in a protective bumper comprising at least one main body portion and at least one secondary portion, the latter being movable relatively to said main body portion upon being subjected to an impact loading and returning to the original position upon removal of said loading.

The invention further consists in a vehicle having a protective bumper and bumper support arms which at their mounting to the vehicle are provided with flanges embedded in a compressible material contained in a housing having internal flanges, both sets of flanges being spaced from each other by the compressible material.

The invention further consists in a bumper mounting arrangement comprising a housing of generally frusto-conical configuration adapted to be mounted on the bumper and positioned at least partly inside a hollow housing of similar configuration adapted to be mounted on the vehicle, the arrangement being such that, on impact, the first housing is forced into the second housing, resistance to the relative movement being caused by the stretching of the second housing to accommodate the entry of the first housing.

The bumper may be of any suitable construction and materials including sheet metal (e.g. steel) or plastics material extruded metal (e.g. aluminium) or plastics material of either single or laminated construction, or of a metal (say chromed aluminium) finish on a plastics (e.g. neoprene) solid or extruded and/or aerated core, of any solid continuous material such as timber or rubber or aerated rubber or plastics which may be metal reinforced. The support arms and fixings could likewise be of any suitable materials, including timber, steel, aluminium, solid rubber, aerated rubber or compressed gas.

In the accompanying drawings:

FIG. 1 is a side elevation of a vehicle having front and rear protective bumpers according to the present invention, FIG. 2 is a front view of the vehicle shown in FIG. 1, FIG. 3 is a rear view of the vehicle shown in FIG. 1, FIG. 4 is a plan view of the vehicle shown in FIG. 1, FIG. 5 is a side elevation of the front portion of a tracked vehicle, such as a railway locomotive, having a bumper according to the present invention, FIG. 6 is a front view of the tracked vehicle shown in FIG. 5, FIG. 7 is a plan view of the tracked vehicle shown in FIG. 5, FIG. 8 is a side elevation, partly in section, of one form of mounting of a bumper on a vehicle.

FIGS. 10 to 15 are cross-sections through various forms of bumper according to the present invention.

FIG. 16 is a sectional view taken through the bumper support arm mounting arrangement illustrated in FIG. 9, and depicts the helical support arm flanges embedded in a compressible material contained in a housing having internal helical flanges.

FIG. 17 is a fragmentary plan view of a modification of the structure illustrated in FIGS. 9 and 16, and depicts spaced annular flanges in place of the helical flanges.

Figure 7:
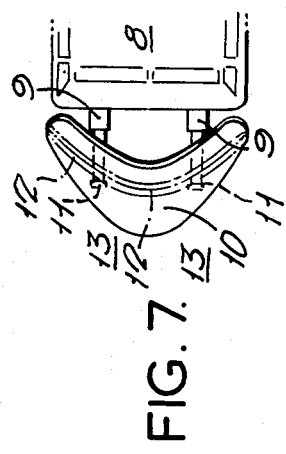

FIGS. 1 to 4 of the accompanying drawings show a vehicle fitted with front and rear bumpers 2 and 2a, respectively, which direct air moving past the vehicle in the direction of arrows 3 wholly or partly upwards, so causing the bumpers 2 and 2a as a whole to deflect downwards in the direction of arrows 4 and to transfer this downward load via mountings 5 to the vehicle which in turn transfers this downward thrust 4 to the wheels 6, so improving the adhesion between the tires and the road. Reference numeral 7 indicates the direction of movement of the vehicle.

FIGS. 5 to 7 show the front portion of a railway locomotive 8 provided with a bumper 10 which is mounted thereon by means of known hydraulic piston-and-cylinder arrangements 9. The bumper 10 serves, in addition to the function referred to above, as a 'cow-catcher' or a means of reducing the risk of humans falling under the wheels, and which on serious impact with another vehicle twists on hinges 11 at the ends of the hydraulic piston-and-cylinder arrangements to a position 12 where it tends to push obstacles clear of its path 13.

Figure 8:
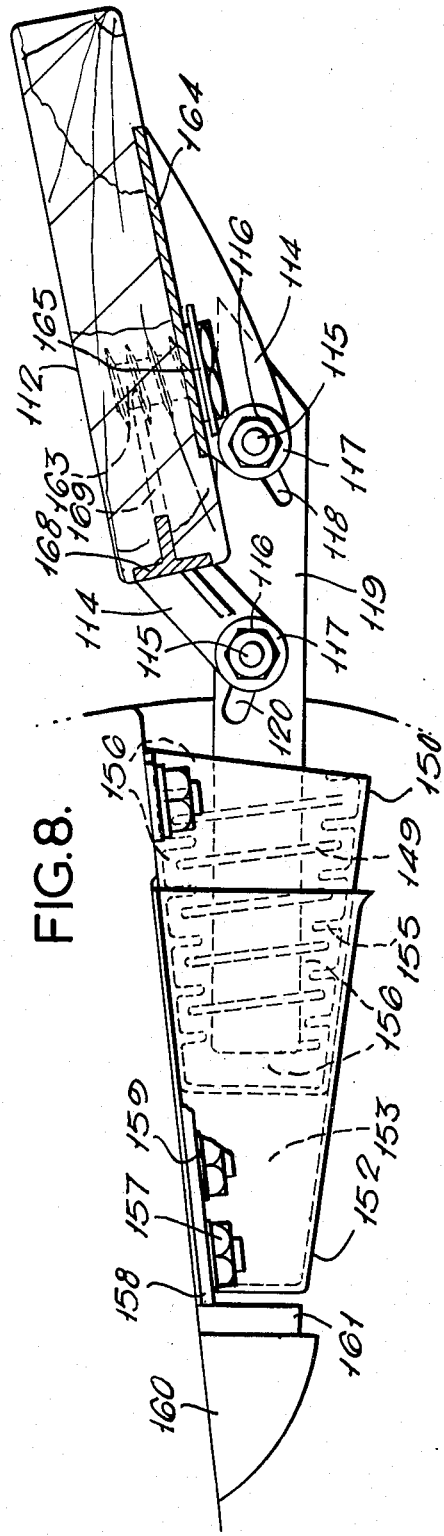
Figure 9:
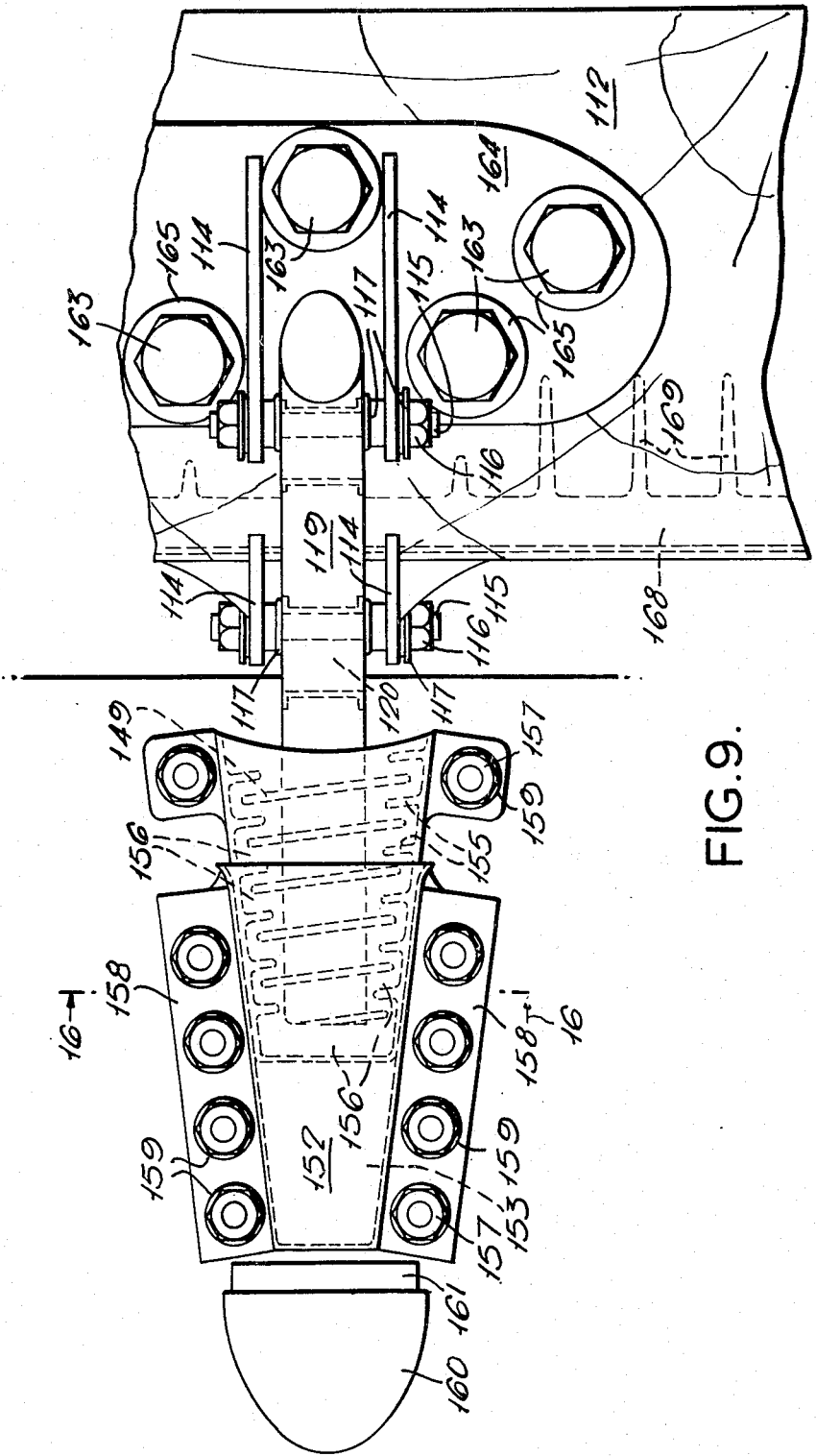
FIG. 9 is an underside plan view of FIG. 8.

In FIGS. 8 and 9 is shown an alternative means of mounting and moving a motor vehicle bumper (in this case the rear bumper) from its aerofoil angle to a horizontal position suitable to withstand severe impact. In this arrangement the bumper 112 is fixed by brackets 114 and bolts 115 with nuts 116 and friction washers 117 to a tapering sleeved slot 118 in the support arm 119, so that the width of the narrowest end of the tapering slot corresponds to the diameter of the bolt. In operation, serious impact overcomes the resistance of the friction washers 117 and causes the bolt to move along the slot expanding and distorting it and so resisting the impact. Alternatively if it is intended that undue resistance shall not be caused at this point in the assembly, the slot may have parallel sides 120 which will not damage the support arm on impact. The bumper could then be returned to its original position by merely loosening the nuts 116 and pulling the bumper 112 and bolts 115 back along the slot.

FIGS. 10 to 15 disclose embodiments of alternative means of arranging for a bumper to have one section riding over another on impact and returning without damage to its original position when the impact loading is removed. All the means illustrated have been shown in their most practical form, with two sets of contact surfaces angled to each so that the sliding movement does not score the exposed finish of the bumper, but of course the top and bottom contact surfaces could be at any angle to each other, or parallel. For simplicity only a typical cross-section of bumper has been shown in each case, the fixings and support arms being omitted for clarity. Each means can be incorporated using any material or construction for the bumper sections, the different materials and construction shown being interchangeable. In all Figures the most likely general direction of impact is shown by arrows 46 or 47. FIG. 10 shows a flexible or spring loaded plastic or metal snap-on-type section 221 having embedded or glued into and across its arms 222 a tensile membrane 223 of rubber or elastomeric material, the whole assembly 221 fitting over the main section of the bumper 224 so that the membrane 223 is in tension and provides increased resistance to the one section moving over the other in the direction shown 225. The secondary section 221 is prevented from springing off the main one, due to the force of the tensile membrane by the formation of shoulders at 226. Lubrication may be provided either by oil present in or on a bumper formed of material such as timber, or by the application of a lubricant, preferably able to penetrate the membrane, on initial assembly.

FIG. 11 shows a hollow sheet metal or plastics main section 227 which operates on similar principles to the construction shown in FIG. 10, except that the tension and resistance is effected by spaced compressible nipples or projections 228 which are attached to the secondary section 221 through apertures 229, an external protective rubbing strip 230 of similar material is provided.

FIG. 15 illustrates an arrangement similar to that shown in FIG. 2, but instead of a series of comprehensible projections a continuous compressible inlay 231, preferably of an aerated material such as rubber, is provided which is a non-compressed state before fitment to the main bumper section. When the latter is effected, as shown by dotted line 232 the material is compressed to occupy volume 233. On minor impact it compresses further to some degree and returns, but on major impact the air is forced to burst through the web of material and only escapes with difficulty, so providing considerable impact absorbtion.

FIG. 12 shows the secondary section 221 having seals 234 at the shoulders 226, with gas (e.g. air) under greater than atmospheric pressure provided in the space 235 by means of a recessed valve 236 communicating with an air passage 237 through the main section of the bumper 239, here shown as a solid material such as timber. FIG. 13 shows a similar principle to that of FIG. 12, used in conjunction with a main section of composite or laminated construction, having a harder outer surface of metal 245 and a softer internal structure of extruded plastics material 239 bonded together by means including key 248. The gas is contained inside an expansible sausage shaped container 240 or series of similar or circular containers, which in the most practical embodiment would be pre-sealed and eventually replaceable, but which could be inflated by means of a valve (not shown). Such a bumper could be adapted to meet the regulation of different countries by means of providing pre-sealed containers of varying pressures. FIG. 14 shows the tension and resistance provided in the case of a main bumper section 241 of extruded aluminium construction, by means of a considerable inward spring or pinching action by the ends of arms 242 of the secondary section 243, which is provided along its inner surface with a buffer pad 244 of foamed rubber.

In order to mount the bumper on the vehicle, each support arm 119 has on it, as seen most clearly in FIGS. 9 and 16, a relatively large helical flange 149, mounted in a housing of frusto-conical configuration 150 provided with a corresponding helically arranged internal flange 155. In assembly, the arm 119 is loosely screwed into the housing 150, centrally located and a semi-liquid compressible material 156 such as rubber is inserted into the cavity which then sets. The assembled housing is then fixed to the vehicle by friction fasteners which allow it to slide at its bumper end. The housing 150 is wholly or partly inserted with a light press fit into another housing 152 of corresponding frusto-conical shape, which has at its closed end compressible material 153 such as gas or foamed rubber, and is fixed to the vehicle by high load fasteners 157, possibly of high friction content allowing the second housing 152 to slide to a degree in the direction of impact, through a high load distributor plate 158 or washers 159 having a rounded shoulder to prevent tearing. If the second housing 152 is capable of movement, then a further buffer 160, optionally rubber tipped 161 may be provided behind the assembly.

It will be appreciated that, if desired, the helical flanges may be replaced by spaced annular flanges 170 formed on the support arms 119 and internal surface of the housings 150 as seen in FIG. 17. Alternatively only the telescoping housings with a gas interposed therebetween may provide the impact damping arrangement.

FIGS. 8 and 9 also show the bumper 112 as manufactured from bent timber, in this case solid. It is mounted by fasteners such as special timber threaded bolts 163 to metal fixing brackets 164 having collars 165 to carry the bolts 163 by which they are fixed to the support arms 119, either directly or by the means described above. The support brackets 114 may also be welded or otherwise fixed to an inward facing metal reinforcing bar 168 here shown as of 'T'-shaped cross-section and recessed into a corresponding groove in the timber and having spikes 169 which extend into and secure it to the timber. Depending on the nature of the timber used (i.e. whether the grain tends to compress or expand on bending) and the degree of curvature required, the reinforcing bar 168 may be fitted to the bumper before bending and bent to shape with it, ensuring that the timber does not deform after the bending pressures are released. A suitable material for the reinforcing bar is mild steel optionally oiled or galvanised.

The timber is bent by any known means, but the method used would most probably involve heating and moistening by placing in a steam bath, then bending by straps, clamps or in a male/female solid former, and afterwards drying either by radio-frequency or in a drying cabinet. If an oiled natural finish is desired then the bumper may be placed preferably when hot and dry, in an oil bath which may itself be heated or under pressure.

It will be appreciated that the various features described above may be used separately or in any combination with one another.

What I claim is:

1. A vehicle having a protective bumper and bumper support arms which at their respective mountings to the vehicle are provided with flange means embedded in a compressible material contained in a housing having internal flange means both sets of flange means being spaced from each other by the compressible material, and wherein the support arm flange means and housing flange means each comprise a flange of helical configuration.

2. A vehicle having a protective bumper and bumper support arms which at their respective mountings to the vehicle are provided with flange means embedded in a compressible material contained in a housing having internal flange means both sets of flange means being spaced from each other by the compressible material and, wherein the support arm flange means and housing flange means each comprise a plurality of spaced annular flanges.

3. A vehicle having a protective bumper and a pair of bumper support arms which at their respective mountings to the vehicle are provided with flange means embedded in a compressible material contained in a respective pair of housings each having a closed end and internal flange means both sets of flange means being spaced from each other by the compressible material, and wherein the housing is of frusto-conical configuration and frictionally engages an outer housing of similar configuration a space being formed between the closed ends of the two housings which accommodates a compressible material.

4. A vehicle as claimed in claim 3, wherein said outer housing is mounted on the vehicle by fastening means which permit limited movement of the housing in the event of the bumper being subjected to a high impact force.

5. A vehicle as claimed in claim 4, wherein a buffer is provided behind said outer housing in the direction of impact movement.

* * * * *